T. E. WILLIS & J. W. RODGERS.
COTTON HARVESTER.
APPLICATION FILED AUG. 18, 1909.
1,006,614.
Patented Oct. 24, 1911.
3 SHEETS—SHEET 2.
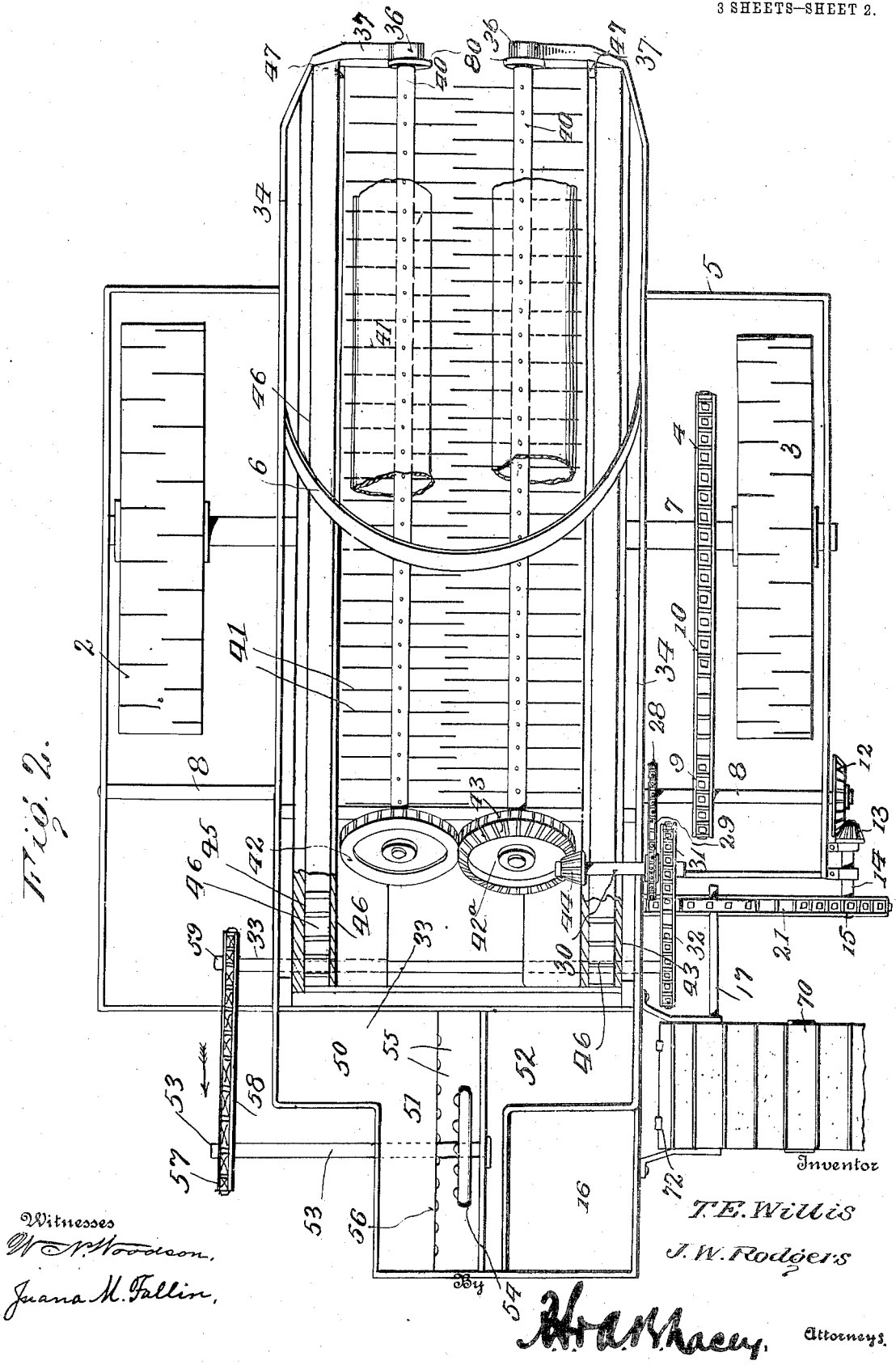

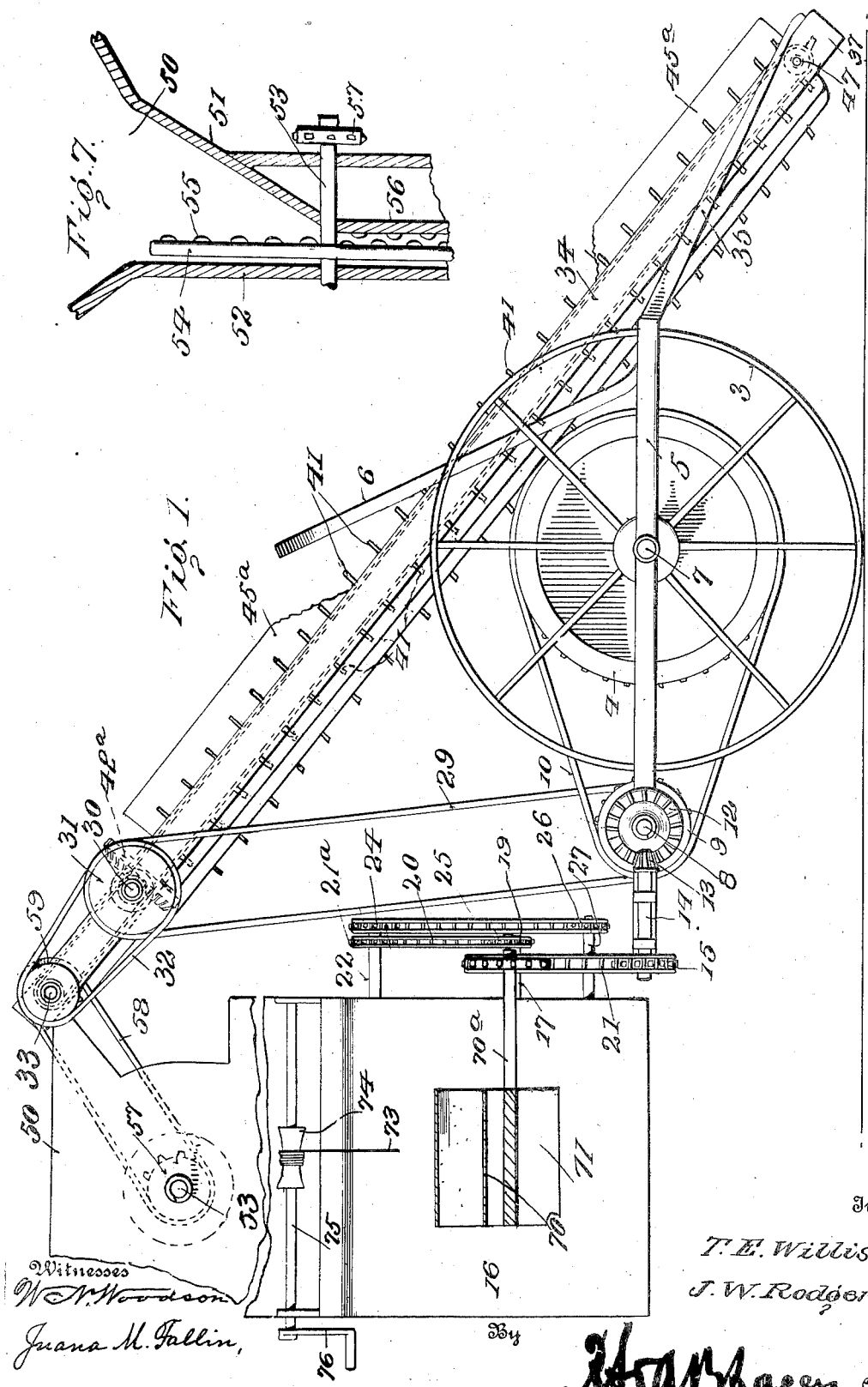
T. E. WILLIS & J. W. RODGERS.
COTTON HARVESTER.
APPLICATION FILED AUG. 18, 1909.
1,006,614.
Patented Oct. 24, 1911.
3 SHEETS—SHEET 1.

T. E. WILLIS & J. W. RODGERS.
COTTON HARVESTER.
APPLICATION FILED AUG. 18, 1909.
1,006,614.
Patented Oct. 24, 1911.
3 SHEETS—SHEET 3.
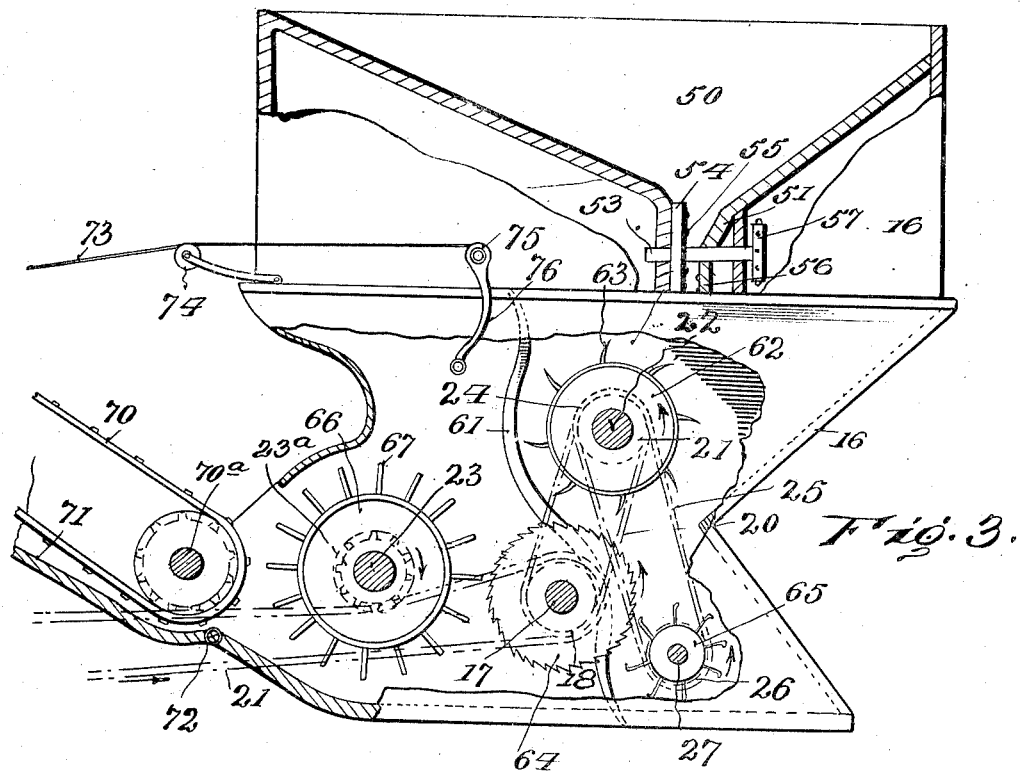
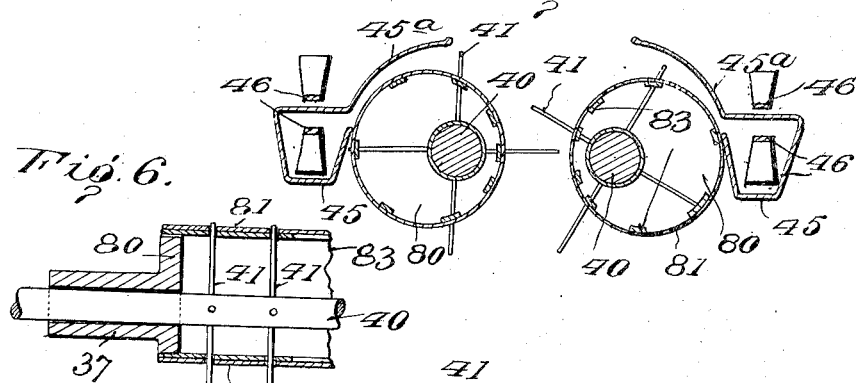
Witnesses
Inventor
T. E. Willis
J. W. Rodgers
By
Attorneys.

UNITED STATES PATENT OFFICE.

THOMAS E. WILLIS AND JOSEPH W. RODGERS, OF HENNESSEY, OKLAHOMA.

COTTON-HARVESTER.

1,006,614.   Specification of Letters Patent.   Patented Oct. 24, 1911.

Application filed August 18, 1909. Serial No. 513,488.

*To all whom it may concern:*

Be it known that we, THOMAS E. WILLIS and JOSEPH W. RODGERS, citizens of the United States, both residing at Hennessey, in the county of Kingfisher and State of Oklahoma, have invented certain new and useful Improvements in Cotton-Harvesters, of which the following is a specification.

Our invention relates to harvesting machines, and particularly to a machine adapted to harvest cotton or any like plant, the object of the invention being to provide a machine which is adapted to be drawn along the row of growing cotton to remove the cotton bolls from the stalk, carry the cotton bolls upward to a crusher wherein the hull of the cotton is crushed, then to carry the crushed cotton bolls into contact with a multiplicity of cleaning saws which will act to tear the cotton apart and to remove the hulls therefrom, and eventually to carry the cotton from the machine into any suitable receptacle, as a cart moving beside the machine.

In its broad features, the invention includes a wheeled frame having stalk-stripping mechanism or picking mechanism moving astraddle of the row and operating to engage the stalk and to pick therefrom all the bolls of cotton, whatever their height may be, within ordinary limits of cotton growth. This cotton is picked by opposed revolving pickers, consisting of rotatable shafts having picking fingers projecting therefrom. These fingers carry the cotton to opposed elevator belts by which the cotton bolls are carried upward and dumped into a hopper of a crusher. This crusher consists preferably of two opposed plates relatively rotatable with regard to each other, these plates preferably being corrugated or otherwise formed so as to crush or smash the hulls surrounding the cotton bolls. The cleaning mechanism comprises a series of saws against which the cotton is forced and by which it is carried through and between parallel bars and into contact with rotatable brushes. The cotton then passes to an elevator or conveyer, as before stated. The several mechanisms, that is, the picking, elevating, crushing and cleaning mechanisms are all driven from the traction wheels of the machine, and all operate as the machine is dragged along the row to pick the cotton therefrom and carry it through the operations above described.

For a full understanding of the invention and the merits thereof, and to acquire a knowledge of the details of construction, reference is to be had to the following description and accompanying drawings, in which:

Figure 1 is a side elevation of our improved cotton harvester; Fig. 2 is a plan view thereof; Fig. 3 is a sectional view showing the cleaning and separating mechanism on the line $x$—$x$ of Fig. 2; Fig. 4 is a transverse detail section of the picking shafts and the elevator chutes; Fig. 5 is a fragmentary perspective view of one end of a picker shaft showing the means for removing cotton from the picking fingers; Fig. 6 is a fragmentary section of one end of the canvas cylinder surrounding a picking shaft; and, Fig. 7 is a section of the crushing hopper and crushing plates therein.

Corresponding and like parts are referred to in the following description and indicated in all the views of the drawing by the same reference characters.

Referring to the drawings, 2 and 3 designate ordinary traction wheels having teeth projecting from their faces. The axle 7 carries upon it the sprocket wheel 4. A frame 5 of any suitable character is supported upon the axle 7, and upon this frame is carried the operating mechanism. The forward end of the frame is provided with the U-shaped yoke 6 which arches over the picking and elevating mechanism. Mounted upon the frame, rearward of the traction wheels, is the main driving shaft 8 which carries on it a sprocket wheel 9 alining with the sprocket wheel 4 and driven therefrom by a sprocket chain 10. One extremity of the shaft 8 extends outward slightly beyond one side of the frame and is there provided with the bevel gear wheel 12 which gears with a bevel wheel 13 on a stub shaft 14, this shaft also carrying a sprocket wheel 15.

Mounted upon the rear of the supporting frame 5 is the box or casing 16 which contains the boll-crushing mechanism and the cleaning mechanism. Projecting from the casing 16 is a shaft 17 which carries upon it the sprocket wheel 18 which is driven by the sprocket chain 21 passing around the sprocket wheel 15. The extremity of the shaft 17 is provided with a sprocket wheel 19 over which passes a sprocket chain 20 which engages with a sprocket wheel 21$^a$ on a shaft 22. The sprocket chain 21 also passes beneath a sprocket wheel on a shaft 23 and drives the same. The extremity of the shaft 22 carries a sprocket wheel 24, which through a sprocket chain 25 drives a sprocket wheel 26 on a shaft 27. These shafts, as will be later described, are the operating shafts for the cleaning rolls and brushes and the elevator. The shaft 8 carries upon it a sprocket wheel 28 which by means of a sprocket chain 29 drives a stub shaft 30 which operates the picking mechanism to be later described. This shaft 30 also carries a sprocket wheel 31 through which a sprocket chain 32 drives an elevator-actuating shaft 33. The picking mechanism is mounted on an inclined frame comprising opposed side-bars 34 which are upwardly and rearwardly inclined and supported upon the yoke 6. The lower ends of the side bars 34 are inwardly bent as at 37 and are formed at their ends with bearings 36 for the opposed rearwardly and upwardly extending picker shafts 40, the upper ends of these shafts being mounted in suitable bearings on a crosspiece extending between the sidepieces 34. These shafts 40 are parallel to each other, rotated in opposite directions, and are provided with a plurality of outwardly projecting pins 41, the ends of these pins overlapping where they pass each other. The two shafts are spaced sufficiently apart to permit them to straddle a row of cotton so that the stalks of the row will project up between the picker shafts, and so that in the rotation of the shafts, the picker fingers or pins 41 will break the cotton boll from the stalk or strip it therefrom. The upper ends of the shafts 40 are provided with the intermeshing toothed gears 42 and 42$^a$. One of these gears 42$^a$ is formed with a beveled face 43 provided with teeth engaging with a bevel gear 44 on the extremity of the stub shaft 30. It will thus be seen that a movement of the harvester along a cotton row will cause the opposite rotation of the shafts 40 and that these shafts will move upward and outward in reverse directions away from the center of the stripper toward the sides thereof. It will also be seen that the picker shafts being inclined, the fingers will engage with the cotton bolls, no matter what the height of the same may be on the stalks.

As a means of elevating the cotton bolls stripped by the fingers 41, we provide on each side of the frame the conveyer troughs 45 shown most clearly in Fig. 4, into which the cotton will be carried by the fingers 41, the cotton being forced off these fingers by means which will be later described. These troughs are formed with inwardly projecting hoods 45$^a$ which extend over the stripper shafts. Each of the troughs 45 is provided with an endless conveyer belt 46 having conveyer blades thereon. These belts at their lower ends are carried in rollers supported on shafts 47 mounted on the lower end of the inclined frame, and at their upper ends the conveyer belts pass over rollers mounted on the shaft 33 driven as before described. Thus, as the machine moves along the field, the stripper shafts will be rotated, stripping the bolls from the stalk and throwing these bolls or the cotton torn therefrom, into the conveyer troughs, and the conveyers carry this cotton upward into a hopper 50, this hopper being shown in section in Fig. 7. This is the crushing hopper, wherein the bolls are crushed so that the hulls will easily separate from the cotton in the cleaning device. Passing through the hopper is the shaft 53 carrying upon it the rotatable crushing disk 54 which is corrugated or formed with a plurality of bosses 55 projecting from its face. The inclined side of the hopper 51 extends down to the center of rotation of the plate 54, as shown in Fig. 7, and from this point a partition plate 56 extends downward to the bottom of the hopper structure. This plate 56 is also provided with corrugations or bosses. Thus, the cotton bolls placed within the hopper pass downward between two plates 54 and 56, and the bolls are crushed. The shaft 53 carries on its end a sprocket wheel 57 which is driven by a sprocket chain 58 from a sprocket wheel 59 mounted on the shaft 33.

From the crushing plates, the cotton bolls pass downward into a casing 60 which is divided into two parts by a plurality of bars 61, these bars being curved, as shown in Fig. 3. Mounted in the casing 60 on the intake side of the casing, is the rotatable beater 62 mounted on the shaft 22. This beater comprises a cylinder having projecting from it a number of curved teeth 63, whereby the cotton is drawn downward and fed to a gang of saws 64 mounted on the shaft 17. This shaft 17 is driven by the sprocket chain 21, as previously described. The saws are set alternately to the bars 61 and act to draw the cotton through these bars, these bars acting as cleaners or clearers to detach the cotton from the hull. At the lower end of the front part of the casing 60 is a rotatable shedder 65 having projecting from it a plurality of hooks, this shedder acting to throw the hulls away from the saws and prevent the clogging of the saws. Mounted beyond the saws 64 is the rotatable brush 66 having the bristles 67, this brush gathering the cotton from the saws and delivering it to the conveyer belt 70, whereby the cotton is carried to a wagon or to any other desired point. The rotatable brush 66 is mounted on a shaft 23, having a sprocket gear 23$^a$ engaged by a belt 21 and the conveyer belt is mounted upon the shaft 70$^a$ which is rotated as before described. The conveyer 70 is mounted in a conveyer trough 71 which is hinged at its rear end, as at 72.

upon the casing 16 at its delivery mouth. The free end of the conveyer trough 71 may be lifted up or down by means of a cord or connection 73 which passes over a guide roller 74, and is wound upon a shaft 75 having thereon the crank 76. Any other means, however, may be used for elevating the conveyer trough.

The means for forcing the cotton engaged by the stripping fingers 41 off of said fingers and into the troughs 45 and preventing the cotton from falling down between the fingers after it has been stripped, is as follows: Mounted upon the ends of the stripper shafts 40, as shown in Fig. 6, and rigidly attached to the frame bars 34, are the eccentric disks 80, these disks being fixed, it will be understood, and nonrotatable. 81 designates a tube or cylinder of canvas, or other suitable material, which is braced by a series of interior longitudinal strips 83. These strips may be made of any suitable material, and preferably some of the strips are of iron, while some are of wood. The ends of this canvas cylinder, or more correctly, the ends of the strips 83 are supported on the eccentrics 80, the pins or fingers 41 passing through some of the strips 83 or through the canvas body of the cylinder, so that the cylinder is freely movable upon the pins. It will be seen from Fig. 4 that the eccentrics 80 are so placed that the large portion of the eccentric extends outward or toward the troughs 45, and it will be obvious that upon a rotation of the shafts 40, the fingers will be gradually withdrawn into the canvas cylinder, as they approach the troughs 45, whereas those fingers 41 which are projecting toward the opposite stripper and engaging with a plant, extend practically entirely out of the cylinder 81. Cotton picked up upon the fingers 41 or otherwise engaged thereby will thus be gradually forced out to the extremities of the fingers, and when the fingers arrive opposite to the entrance to the trough 45, the cotton will be forced entirely out and will fall into the trough. The cylinder 81 prevents the cotton falling through the fingers after once it has been lifted as would be the case was there nothing for the cotton to rest upon, and also clears the pins or fingers from adhering cotton.

The operation of the invention is as follows: The harvester is moved along the cotton row, and in its course, the stripping fingers will tear the cotton bolls from the stalk and deposit the cotton bolls onto the upwardly moving conveyer belts. The conveyer belts carry the bolls to the crushing hopper, into which the bolls drop. The bolls pass between the crushing plates, and the hulls are smashed. They thence pass into the cleaning compartment, where the saws tend to tear the cotton from the hulls, the hulls being thrown to one side by the cylinder 65. The cotton is drawn between the bars 61 and is then gathered from the saws by means of the brush 66 which deposits it upon the conveyer 70, whereby the cotton is carried to the desired point.

It will be seen that our invention is thoroughly effective in operation, and that it not only picks the cotton, but delivers the cotton in a relatively clean state and practically in a condition such as the cotton would have after having been cleaned by hand.

While we have shown what we believe to be the preferable form of our invention, it will be obvious that many modifications might be made, particularly in the system of driving gears employed, the crushing and cleaning mechanisms being of course adapted to be driven from the traction wheels 3 in many different ways which will be obvious to any skilled mechanic.

Having thus described the invention, what is claimed as new is:—

1. In a cotton harvester, picking mechanism including upwardly and rearwardly extending, spaced parallel shafts, each provided with radially projecting fingers, the fingers on one shaft overlapping the fingers on the other, a trough for each of said shafts, into which the cotton is to be deposited from the picking fingers, and a rotatable cylinder surrounding each picking shaft and eccentrically set thereto, through which cylinder the picking fingers pass.

2. In a cotton harvester, picking mechanism including opposed upwardly and rearwardly extending parallel shafts, conveyer troughs mounted adjacent to and parallel with each of said shafts, a rotatable cylinder inclosing each of said shafts and larger than the same, said cylinder being set eccentrically to the inclosed shaft and having its swell extended toward said troughs, and picking fingers radially projecting from each shaft and extending through said cylinder, the length of the fingers being equal to the greatest distance between the cylinder and the picker shaft, said picking fingers on one cylinder overlapping the picking fingers on the other cylinder.

3. In a cotton harvester, picking mechanism including opposed parallel shafts rotatable toward each other in opposite directions, a conveyer trough for each of said shafts mounted exteriorly thereto and parallel therewith, fixed eccentrics surrounding the shaft, but not rotatable therewith, said eccentrics extending outward from the shaft and nearly into contact with the trough, a cylinder surrounding the shaft and rotatable upon the fixed eccentrics, and picking fingers on each shaft projecting radially outward therefrom and passing through said cylinder.

4. In a cotton harvester, picking mechanism including opposed parallel upwardly and rearwardly inclined shafts, each provided with radial stripping fingers, the fingers of one shaft overlapping the fingers of the other shaft, opposed conveyer troughs arranged on the outer side of each of said shafts, approximately in the path of travel of the stripping fingers, hoods extending over the conveyer troughs and partly around the ends of the stripping fingers, eccentric disks surrounding each shaft, but not rotatable therewith, said eccentric disks having their longest radii extending toward and contacting with the inner edge of the adjacent trough, a cylinder surrounding each of the shafts and supported upon the eccentric disk, said cylinder, however, being rotatable upon the disks, the stripping fingers on the shafts passing through said cylinder and acting to rotate the same.

5. In a cotton harvester, picking mechanism including a frame, upwardly and rearwardly inclined opposed picking shafts mounted in the frame and rotatable in opposite directions, radially projecting fingers on the shafts, the fingers of one shaft overlapping the fingers of the other shaft, upwardly inclined troughs, one on the outside of each of the picking shafts, conveyers mounted in said trough, eccentric disks surrounding each of the shafts, but not rotatable therewith, a cylinder of fabric surrounding each of said shafts, but larger than the same, the ends of said cylinder being supported upon said eccentric disks, the cylinder being rotatable upon said disks, and the fingers of the shaft passing through said cylinder to rotate the same, longitudinal strips supporting each cylinder, and means for giving to the shafts rotation in opposite directions to each other.

6. In a cotton harvester, picking mechanism including an upwardly and rearwardly inclined frame, opposed parallel upwardly and rearwardly inclined shafts mounted in the frame, toothed gears on the upper ends of said shafts meshing with each other, means for driving said gears and thereby rotating the shafts, upwardly inclined conveyer troughs, one on the outside of each of said shafts, eccentric disks surrounding the shafts, but nonrotatable therewith, said disks extending outward toward the adjacent trough, a cylinder surrounding each of the shafts, but larger than the same, said cylinder being carried upon the eccentric disks, but nonrotatable therewith, and radial fingers attached to each shaft and projecting out therefrom through the cylinder inclosing the same.

In testimony whereof we affix our signatures in presence of two witnesses.

THOMAS E. WILLIS. [L. S.]
JOSEPH W. RODGERS. [L. S.]

Witnesses:
AMBROSE DIXON,
W. C. LOVETTE.